United States Patent [19]
Gilles

[11] 3,980,355
[45] Sept. 14, 1976

[54] BEARING BOXES FOR ROTARY SHAFTS SUBJECTED TO TWISTING MOMENTS

[76] Inventor: Bartolome Gilles, Colonia San Pedro, La Paz, Entre Rios, Argentina

[22] Filed: June 10, 1975

[21] Appl. No.: 585,723

[30] Foreign Application Priority Data
June 17, 1974 Argentina .............................. 254238

[52] U.S. Cl. ............................... 308/181; 172/518; 308/19
[51] Int. Cl.² ......................................... F16C 13/00
[58] Field of Search .............. 308/19, 181; 172/518

[56] References Cited
UNITED STATES PATENTS

| | | | |
|---|---|---|---|
| 721,951 | 3/1903 | Hendon | 308/181 |
| 1,662,325 | 3/1928 | Otoupal | 308/181 |
| 2,314,469 | 3/1943 | Walker | 308/181 |
| 2,597,524 | 5/1952 | Birt | 308/181 |
| 2,597,942 | 5/1952 | McCullough | 308/181 |
| 2,850,337 | 9/1958 | McCallum | 308/181 |
| 3,111,351 | 11/1963 | Tanke | 308/181 |

*Primary Examiner*—M. H. Wood, Jr.
*Assistant Examiner*—Richard A. Bertsch
*Attorney, Agent, or Firm*—Sughrue, Rothwell, Mion, Zinn and Macpeak

[57] ABSTRACT

An improvement in bearing boxes adapted to mount on rotary shafts objects subjected to twisting moments. Such objects are conventionally mounted by means of a pair of oppositely disposed conical roller bearings, and the improvement comprises a third conical roller bearing disposed adjacent to the sides of the objects opposite to the sides subjected to the twisting moments. The invention is particularly adapted to, and is illustrated in the context of, agricultural earthworking implements such as harrows.

1 Claim, 3 Drawing Figures

BEARING BOXES FOR ROTARY SHAFTS SUBJECTED TO TWISTING MOMENTS

CROSS-REFERENCE TO RELATED APPLICATION

This application is intended to be largely a translation of Argentine application Ser. No. 254,238, filed June 17, 1974, the text of which is hereby incorporated by reference. To the extent that the disclosure hereof varies from the text of that application, the text of the original Argentine application should govern.

FIELD OF THE INVENTION

The present invention relates to an improvement in bearing boxes adapted to mount on rotary shafts objects subjected to twisting moments. Such objects are conventionally mounted by means of a pair of oppositely disposed conical roller bearings, and the improvement comprises a third conical roller bearing disposed adjacent to the sides of the objects opposite to the sides subjected to the twisting moments.

The present invention is particularly adapted for use in bearing boxes designed for the assembly of shafts bearing concave rotary disks for working the earth. The journal bearings in point are generally provided on agricultural implements, such as harrows.

DESCRIPTION OF THE PRIOR ART

Agricultural implements for ploughing, breaking up, and harrowing the ground are already known which consist of a frame supporting one or more shafts on which are mounted a number of circular rotary disks having a concave, double-curved surface. These implements are drawn by a motor vehicle, and each of the disks penetrates the earth at an oblique angle with respect to the direction of movement so as to turn the earth and obtain a wider furrow. As a result, the disks are subjected to twisting moments which act on these assembly zones and produce differential forces which cause differing wear of the conical roller bearings with which the bearing boxes of the assembly mechanisms are provided. Because of this, it has been found in practice that the bearing which is on the attack side of the disk face is worn down less than the bearing on the opposite side of the disk. Accordingly, after a short period of use, these implements must undergo a preliminary overhaul to obviate these disadvantages and keep them in working order.

SUMMARY OF THE INVENTION

According to the present invention, the above drawback to the prior art is overcome by means of the provision of a third conical roller bearing disposed adjacent to the sides of the disks opposite to the attack sides of the disk faces.

In its preferred embodiment, the present invention consists essentially in that the roller boxes which are attached to the frame and which provide the rolling relationship with the rotary shafts include a third bearing mounted further apart from the convex face than the other two bearings which are conventionally provided on such devices. This system of roller boxes and associated parts includes a novel disposition of parts and relationships which provide them with considerable advantages over those of the known type.

DETAILED DESCRIPTION OF A PREFERRED EMBODIMENT

Figure 1:
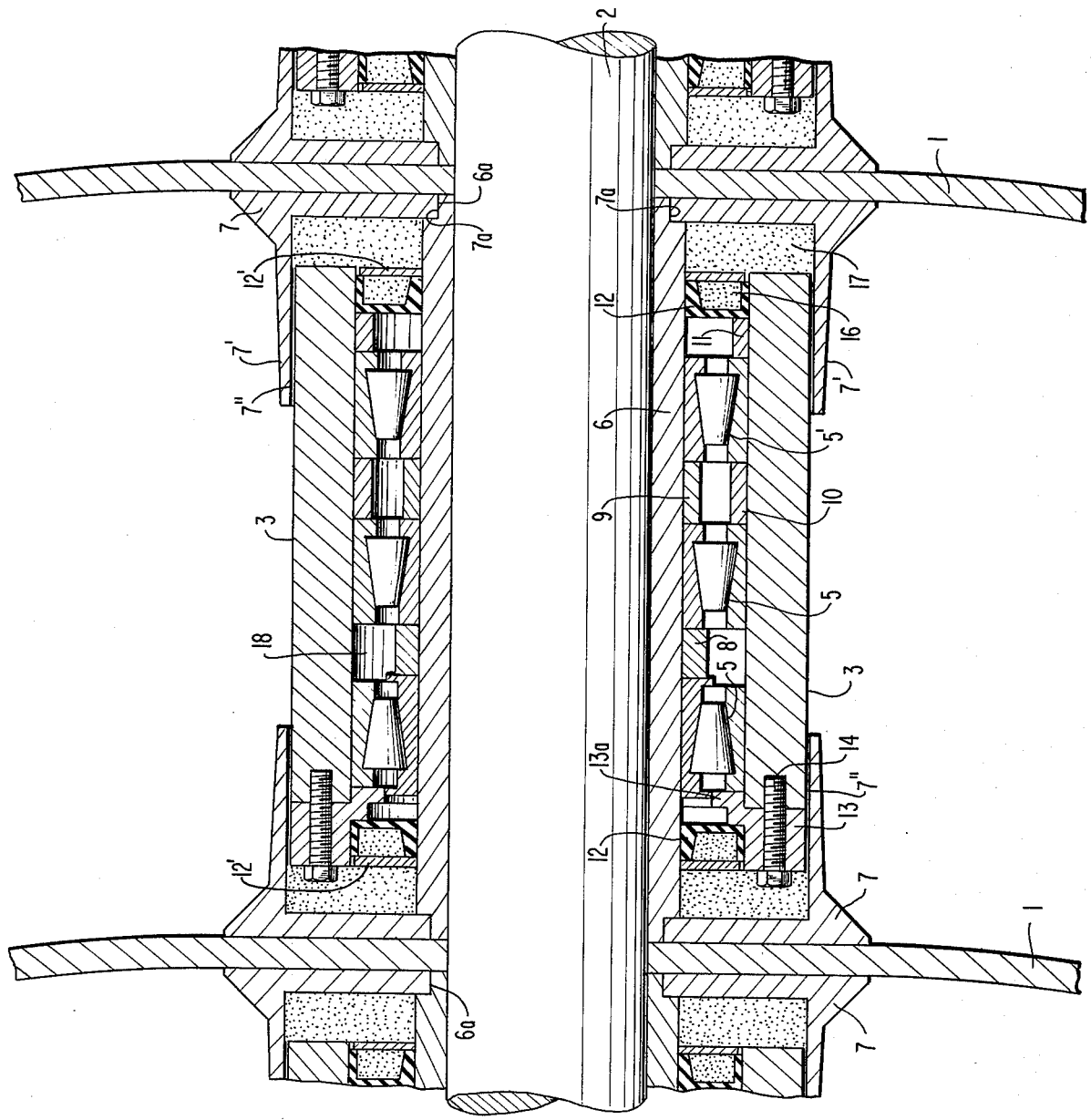
FIG. 1 is a diametrical sectional view of the improved assembly device for one of said disks on a rotary shaft.
Figure 2:
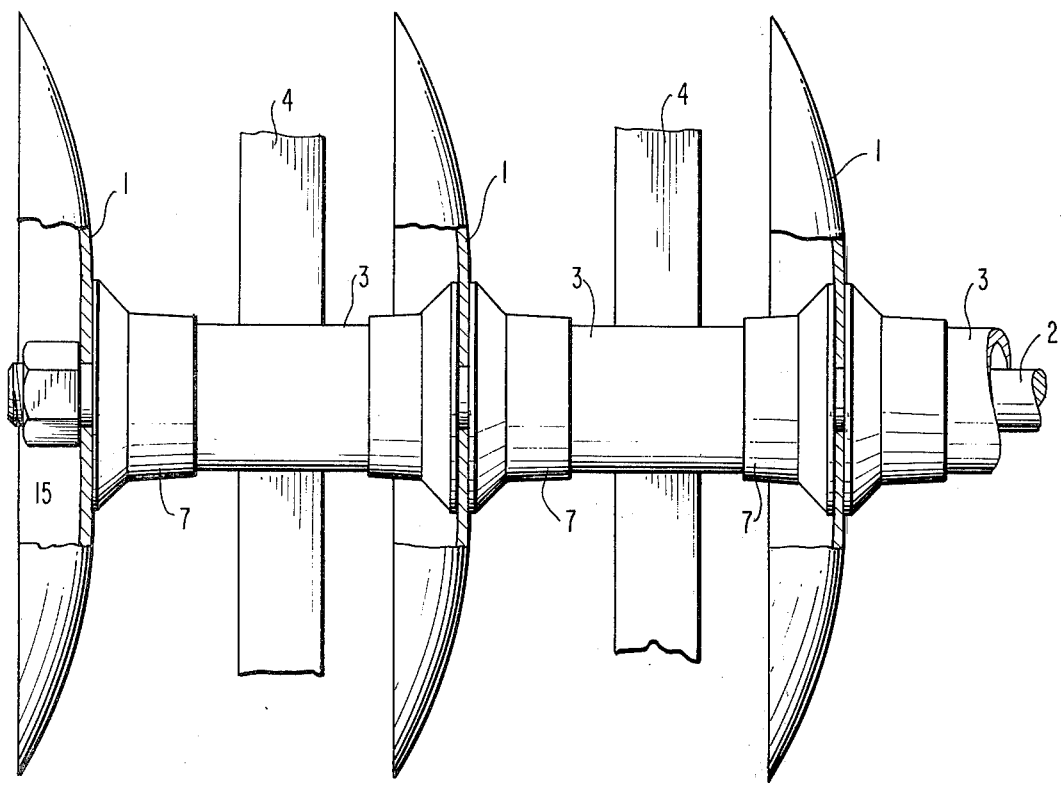
FIG. 2 is a view of a portion of one of said shafts, showing several partially sectional disks.
Figure 3:
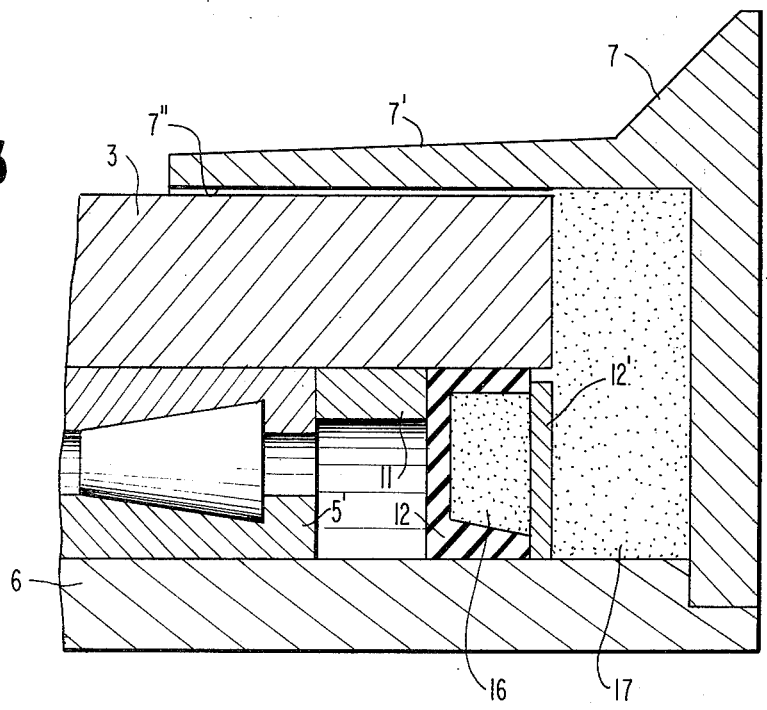
FIG. 3 is a fragmentary diametrical view which shows in detail a portion of the assembly shown in FIG. 1.

In the preferred embodiment, rotary disks 1 are rigidly mounted on a rotary shaft 2 which, in turn, is covered with a series of non-rotary sleeves 3 which are interposed between the disks 1 and rigidly attached to the posts 4 forming the supporting frame of the implement. A pair of conical roller bearings 5 are lodged between each sleeve 3 and a second sleeve 6 integral with the shaft 2. The roller bearings 5 are oppositely disposed so as to absorb lateral stresses. These are the known components which are generally provided in this type of agricultural implement. The present improvement comprises a pair of tubes 7 which are centrally hollow and which are mounted on the shaft 2 in integral abutment with the disk 1. The tubes 7 are prolonged by cylindrical skirts 7' that cover in part the adjacent end of each sleeve 3; between the sleeve 3 and each skirt 7' there is a small opening 7'' to avoid friction between the non-rotary sleeve and the rotary tubes. Reference 18 indicates the cylindrical recess between the non-rotary sleeve 3 and the second sleeve 6; this recess receives the conical roller bearings 5 and also a third bearing 5', which is further disposed in one of the ends of said lodging adjacent to the concave face of the disk 1. The recess 18 carries the usual charge of a suitable lubricant.

Between each pair of bearings 5 there is interposed an additional part consisting of a spacer hoop 8 mounted on the surface of the sleeve 6, and between each pair of bearings 5 and 5' there is provided a double set of additional parts consisting of an inner spacer hoop 9 mounted on the sleeve 6 and an outer spacer hoop 10 mounted on the non-rotary sleeve 3. There is further provided a fourth spacer hoop 11 disposed on the other edge of the bearing 5' and in contact with the inner wall of the non-rotary sleeve 3.

The space occupied by the combination of bearings and spacer hoops is sealed by two flexible oil retaining elements 12 which are known per se and which prevent the grease contained in the chambers 16 from escaping to the outside. The grease fills the chambers and establishes a seal to prevent the infiltration of external factors such as dust, water, sand, etc., into the assembly through the small opening 7''. The retaining elements 12 are covered by means of washers 12'. A second chamber 17 is defined by the space between each washer 12' and the inner face of each tube 7, and it too is filled by a quantity of protective grease.

Of the two oil retaining elements 12, the one which is disposed adjacent to the convex face of the disk 1 is mounted on a supporting means 13 which provides it with the necessary support surface in the form of a series of concentric steps. The supporting means 13 comprises at its inner part a hammered portion 13a which enters into abutment with the edge of the outer cup of the left-hand bearing 5. This supporting means 13 is rigidly secured by means of bolts 14 to the adjacent side of the sleeve 3.

The sleeve 6 is provided at its two ends with annular steps 6a on which the corresponding edges 7a of the central openings of the tubes 7 are supported. The rotary system formed by the disks 1, the sleeves 6, the tubes 7, the inner cups of the bearings 5 and 5', and the additional parts 8, 9, and 11 are joined together and to the shaft 2 by means of the axial adjustment obtained by nuts 15 turned at the threaded ends of the shaft 2. Thus, the rotary system forms a single rotary unit which is supported by the posts 4 forming the structure of the implement. The posts 4 are rigidly attached to the non-rotary sleeves 3.

The operational improvements obtained with the present invention are very important. They provide the system with increased resistance at its weak points and also completely seal it against external agents which accelerate wear. On the other hand, it can be easily dismantled for maintenance purposes and for changing any of its parts.

It is known that these implements are drawn by a drive means and that they are disposed at an oblique angle with respect to the direction of movement—i.e., the concave part of the disks penetrates the soil at an oblique angle with respect to the direction of movement, thereby producing in each disk a torsional moment which acts on the outermost bearings with respect to the convex faces of each disk, which produces premature wear of the respective bearing. However, with the improvements according to the present invention, this force is absorbed by the additional bearing 5' disposed adjacent to the zone of influence of the forces.

In addition, the assembly unit consisting of each disk and the convex elements interposed between them and formed by the tubes 7 which are supported by the annular steps 6a of the sleeves 6 and the special configuration of these tubes which are mounted in an overlapping manner on the sleeve 3 provide complete sealing against external agents. The units are also easy to dismantle, since by removing the nut 15 disposed at the ends of the shaft 2 it is possible to successively remove the tubes 7, the disks 1, the supporting means 13, and the system of rollers located in the non-rotary sleeve 3.

Various modifications of construction and detail can obviously be made without departing from the scope of the invention which will be clearly defined in the following claims.

What is claimed is:

1. Improvements to bearing boxes designed for the assembly of shafts bearing concave rotary disks for working the ground, said disks being commonly provided on certain types of agricultural implements and being mounted concentrically and perpendicularly on said shafts which are disposed at an oblique angle with respect to the direction of movement of the implement, said boxes being interposed between each pair of successive disks and each comprising an outer casing fixedly attached to a supporting frame of the implement and an inner box mounted in an inserted manner on said shaft, each box further comprising a pair of roller bearings mounted in rolling relationship between said outer casing and the inner box, characterized in that each box which is disposed adjacent to the convex face of each disk comprises a third bearing disposed further apart from each face than the other two aforementioned bearings, the outer casing consisting of a cylindrical sleeve integral with said frame and said cylindrical box comprising at its ends respective annular steps on which engage in an accurate manner the edges of corresponding circular openings concentrically disposed in the circular bases of respective cylindrical tubes, the cylindrical walls of which tubes are superposed with a small radial opening on the lateral outer parts of the mouths of said sleeve which comprises two conventional oil retention elements disposed on said mouths and the one which is disposed closest to the convex face of the disk is mounted on a supporting catch secured by means of bolts to the side of the sleeve and which provides the seat for the same in the form of an annular step, said supporting catch comprising an annular hammered portion which partially penetrates the interior of the sleeve and abuts against the lateral face of the outer cup of one of the bearings, forming between the said tubes, the portion defined by the retaining elements and the end sides of the sleeve, respective chambers filled with grease separated from the lubricating oil contained in the space defined between the two retaining elements; the said disks mounted on each shaft, the tubes, the boxes and the inner cups of the bearings thus forming a rotary unit, the components of which are mutually connected together and to the shaft by means of a nut turned at the end thereof.

* * * * *